(12) United States Patent
Su et al.

(10) Patent No.: US 9,260,578 B2
(45) Date of Patent: Feb. 16, 2016

(54) THERMOPLASTIC ELASTOMER FOAMING MATERIAL

(75) Inventors: Jan-Rong Su, Kaohsiung County (TW); Cheng-Te Lee, Kaohsiung County (TW); Ching-En Tsai, Tainan (TW)

(73) Assignee: TSRC CORPORATION, Taipei (TW)

( * ) Notice: Subject to any disclaimer, the term of this patent is extended or adjusted under 35 U.S.C. 154(b) by 935 days.

(21) Appl. No.: 12/643,607

(22) Filed: Dec. 21, 2009

(65) Prior Publication Data

US 2010/0099784 A1 Apr. 22, 2010

Related U.S. Application Data

(63) Continuation-in-part of application No. 11/294,306, filed on Dec. 5, 2005, now abandoned.

(30) Foreign Application Priority Data

Nov. 30, 2005 (TW) .................................. 94142206

(51) Int. Cl.
*C08J 9/228* (2006.01)
*C08J 9/10* (2006.01)
*C08J 9/00* (2006.01)

(52) U.S. Cl.
CPC ................ *C08J 9/103* (2013.01); *C08J 9/0061* (2013.01); *C08J 2325/10* (2013.01); *C08J 2353/02* (2013.01); *C08J 2423/00* (2013.01)

(58) Field of Classification Search
CPC . C08L 25/10; C08L 23/0853; C08L 23/0869; C08J 2353/02; C08J 2423/00; C08J 2325/10
USPC ............. 525/88, 98, 191, 221, 222, 227, 231, 525/240, 241
See application file for complete search history.

(56) References Cited

U.S. PATENT DOCUMENTS

| | | | |
|---|---|---|---|
| 4,003,860 A | 1/1977 | LeClerc | |
| 4,546,127 A | 10/1985 | Hashimoto et al. | |
| 4,655,962 A | 4/1987 | Rowland et al. | |
| 4,847,150 A * | 7/1989 | Takeda | 428/318.8 |
| 5,306,779 A | 4/1994 | Shibata et al. | |
| 5,723,543 A | 3/1998 | Modic | |
| 5,726,239 A | 3/1998 | Maes et al. | |
| 6,127,444 A | 10/2000 | Kadri | |
| 6,653,360 B2 | 11/2003 | Gupta | |
| 2003/0225209 A1 | 12/2003 | Handlin, Jr. et al. | |
| 2004/0034149 A1* | 2/2004 | Garcia | 524/474 |
| 2004/0039128 A1 | 2/2004 | Sasagawa et al. | |
| 2004/0097650 A1 | 5/2004 | Ogawa et al. | |
| 2005/0119414 A1 | 6/2005 | Sasagawa et al. | |
| 2005/0124766 A1 | 6/2005 | Kimura et al. | |
| 2007/0129454 A1* | 6/2007 | Su et al. | 521/142 |
| 2009/0247689 A1* | 10/2009 | Wickel et al. | 524/505 |
| 2010/0016458 A1* | 1/2010 | Saitou et al. | 521/134 |

FOREIGN PATENT DOCUMENTS

WO   WO 2008041617 A1 *   4/2008

OTHER PUBLICATIONS

Ramirez-Vargas, E. et al Polymer Engineering and Science vol. 40(10) Oct. 2000 pp. 2241-2250.*
Radhakrishnan C.K. et al. "Polymer Degradation and Stability", vol. 91, pp. 902-910, available online Sep. 8, 2005.
Trimethylolpropane trimethacrylate product data sheet available from www.sigma-aldrich.com on Nov. 30, 2009.
IUPAC definition of block copolymer available at http://goldbook.iupac.org/B00683.html on May 6, 2010.
Derwent Publications Ltd. London, GB, Class A12, AN 2005-015775 XP002387137 & JP 2004 323757 A (Sekisui Plastics Co. Ltd.) Nov. 18, 2004 (abstract only).

* cited by examiner

*Primary Examiner* — Irina S Zemel
*Assistant Examiner* — Jeffrey Lenihan
(74) *Attorney, Agent, or Firm* — Volpe and Koenig, P.C.

(57) ABSTRACT

A thermoplastic elastomer foaming material is provided. The thermoplastic elastomer foaming material includes a hydrogenated styrenic/conjugated diene copolymer in a range from 5 to 35 weight percent; at least one of an acetate copolymer and an acrylate copolymer in a range from 3 to 30 weight percent; an amorphous polyolefin in a range from 20 to 60 weight percent; and a plasticizer in a range from 10 to 40 weight percent.

20 Claims, No Drawings

THERMOPLASTIC ELASTOMER FOAMING MATERIAL

CROSS-REFERENCES TO RELATED APPLICATIONS

This is a continuation-in-part application of U.S. patent application Ser. No. 11/294,306 filed on Dec. 5, 2005, the content of which are incorporated herewith for reference.

FIELD OF THE INVENTION

The present invention relates to a thermoplastic elastomer foaming material, and more particularly to a hydrogenated styrenic/conjugated diene series copolymer based foaming material which is relatively soft and has a low specific gravity and the manufacturing method thereof.

BACKGROUND OF THE INVENTION

Foaming materials are widely used in the daily life; weather-proof seals of cars, heat insulation layers, vibration proof substances on appliances, and soles of shoes are all made of such materials. The materials include ethylene vinyl acetate (EVA), styrene-butadiene rubber (SBR), natural rubber (NR), acrylonitrile-butadiene rubber (NBR), ethylene-propylene-nonconjugated diene rubber (EPDM), butadiene rubber (BR), polyethylene (PE), polystyrene (PS), poly vinyl chloride (PVC), polyurethane (PU), polypropylene (PP), chloroprene rubber (CR), isoprene rubber (IR) and styrene-butadiene-styrene elastomer (SBS) which is also the well-known primary material of soles of shoes. Foaming materials contain a large amount of bubbles, in other words, foaming rubbers or plastics can be seen as composite materials filled with gases. And like other synthetic materials, characteristics of foaming rubbers or plastics can be altered to meet different needs by modifying compositions or processing procedures thereof.

Typically, additives are added into a polymer matrix which is the main part of foaming materials and dominates basic characteristics of such materials. The primary purposes of additives are to improve processing properties of the polymer and to reduce the cost. To meet various needs, the composition of the additives and the polymer matrix can be altered.

In the traditional thermosetting rubber, NR, SBR and CR are well-known close-cell foaming materials. However, they cause air pollution during the manufacturing process by producing $SO_x$ during the vulcanization process. NR, SBR and CR are not only hazardous to environment but also impossible to recycle because they are all thermosetting rubbers. These disadvantages limit applications of such materials.

On the other hand, "ethylene-propylene copolymer" and "ethylene-α-olefin copolymer" are used in the close-cell foaming material. Nevertheless, they are not soft in touch and deform easily under compression. Usually the properties can be improved by adding "polyolefinic rubbers" at specific ratios into these copolymers. But in some circumstances, compatibilities between the copolymers and the rubbers are poor. These copolymers also are not easily processed with processing oils, and thus they are not suitable for making a soft foaming material with low specific gravity.

A flexible thermoplastic article comprising from about 2 to about 15 percent by weight styrene-elastomer block copolymer, from about 60 to about 90 percent by weight polyolefin, from about 4 to about 15 percent by weight plasticizer oil and from about 0.05 to about 3 percent by weight additive was proposed in U.S. Pat. No. 6,653,360. And the styrenic-elastomer block copolymer further comprises SEBS. The flexibility of the article was improved by adding SEBS having excellent compatibility with the plasticizer oil. Nonetheless, the contents of the plasticizer oil and the SEBS are low, so the hardness and specific gravity of the flexible thermoplastic article are still high. And it is not suitable for mass production since two processing steps are needed for manufacturing such article.

In view of needs for a novel material which is environmentally friendly, flexible and easy to be produced, an object of the present invention is to provide a thermoplastic elastomer foaming material which is soft, recyclable and mass producible.

SUMMARY OF THE INVENTION

The above object can be achieved in the present invention by a thermoplastic elastomer foaming material comprising (A) from about 16 to about 50 percents by weight a hydrogenated styrenic/conjugated diene series copolymer, (B) from about 7 to about 50 percents by weight an polyolefinic material and (C) from about 16 to about 45 percents by weight a plasticizer.

In the above thermoplastic elastomer foaming material, the hydrogenated styrenic/conjugated diene series copolymer has a molecular weight of from about 80,000 to about 500,000 grams per mole.

In the above thermoplastic elastomer foaming material, the polyolefinic material includes one selected from the group consisting of ethylene vinyl acetate copolymer, ethylene butyl acrylate, ethylene-α-olefin copolymer and a combination thereof.

In the above thermoplastic elastomer foaming material, the rubber includes one selected from the group consisting of ethylene-propylene-nonconjugated diene rubber, isoprene rubber, styrenic-butadiene rubber, acrylonitrile-butadiene rubber, butadiene rubber and a combination thereof.

In the above thermoplastic elastomer foaming material, the plasticizer includes a processing oil, wherein the processing oil is one selected from the group consisting of paraffinic oil, naphthenic oil, aromatic oil and a combination thereof. More preferably, the processing oil contains from about 0.01% to about 20% aromatics or is free of aromatics.

In the above thermoplastic elastomer foaming material, optionally further includes at least one conventional additive such as, foaming agents, crosslinking agents, foaming promoters, crosslinking promoters, dispersion promoters and fillers. More preferably comprises from about 1.0 to about 10 parts by weight azodicarbonamide as a foaming agent, from about 0.2 to about 5 parts by weight dicumyl peroxide as a crosslinking agent, from about 0.5 to about 6 parts by weight zinc oxide as a foaming promoter, from about 0.1 to about 1.5 parts by weight high molecular weight methacrylate as a crosslinking promoter, from about 0.2 to about 5 parts by weight aliphatic stearic acid as a dispersion promoter and from about 1 to about 120 parts by weight light calcium carbonate as a filler.

In the above thermoplastic elastomer foaming material, the conjugated diene includes one selected from the group consisting of 1,3-butadiene, isoprene, 1,3-pentadiene and a combination thereof, and available unsaturated double bonds of a polymeric unit of the conjugated diene are under 10%, preferably under 5%.

In the above thermoplastic elastomer foaming material, hardness of the thermoplastic elastomer foaming material is from about 3 C to about 30 C.

In the above thermoplastic elastomer foaming material, specific gravity of the thermoplastic elastomer foaming material is from about 0.1 to about 0.25.

In another aspect of the present invention, it relates to a method for processing a relatively soft and low specific gravity thermoplastic elastomer foaming material comprising steps of (A) mixing from about 16 to about 50 percents by weight a hydrogenated styrenic/conjugated diene series copolymer with from about 16 to about 45 percents by weight a plasticizer to form a mixture, (B) compounding the mixture with from about 7 to about 50 percents by weight an polyolefinic material and (C) performing a foam molding.

In the above method, the step (A) includes an adsorbing process and is performed at a temperature between about 50° C. and about 70° C.

In the above method, the step (B) is performed in one of a banbury mixer and a twin-screw extruder and at about 110° C.

In the above method, the step (C) is an open mold foaming and performed at a temperature between about 160° C. and about 180° C.

In the above method, hardness of the thermoplastic elastomer foaming material is from about 3 C to about 30 C.

In the above method, specific gravity of the thermoplastic elastomer foaming material is from about 0.1 to about 0.25.

In the above method, the hydrogenated styrenic/conjugated diene series copolymer has a molecular weight of from about 80,000 to about 500,000 grams per mole.

In a further aspect of the present invention, it relates to a thermoplastic elastomer foaming material comprising a hydrogenated styrenic/conjugated diene copolymer in a range from 5 to 35 weight percent; at least one of an acetate copolymer and an acrylate copolymer in a range from 3 to 30 weight percent; an amorphous polyolefin in a range from 20 to 60 weight percent; and a plasticizer in a range from 10 to 40 weight percent.

In the above thermoplastic elastomer foaming material, the acetate copolymer includes at least one of an ethylene-vinyl acetate copolymer and an ethylene-vinyl acetate-maleic anhydride terpolymer, and the acrylate copolymer includes at least one selected from a group consisting of an ethylene-methyl acrylate copolymer, an ethylene-butyl acrylate copolymer, an ethylene-ethyl hexyl acrylate copolymer, an ethylene-acrylic ester-maleic anhydride terpolymer and an ethylene-acrylic ester-glycidyl methacrylate terpolymer.

In the above thermoplastic elastomer foaming material, the amorphous polyolefin includes at least one selected from a group consisting of a polypropylene, a propylene-ethylene copolymer, an ethylene-α-olefin copolymer, a propylene-α-olefin copolymer and an ethylene-propylene-α-olefin terpolymer.

In the above thermoplastic elastomer foaming material, the plasticizer includes a processing oil.

In the above thermoplastic elastomer foaming material, the processing oil is one selected from a group consisting of a paraffinic oil, a naphthenic oil, an aromatic oil, a natural oil and a combination thereof.

In the above thermoplastic elastomer foaming material, the processing oil contains aromatics in a range from 0.01 to 20 weight percent.

In the above thermoplastic elastomer foaming material, the processing oil is free of aromatics.

The above thermoplastic elastomer foaming material further comprises at least one additive selected from a group consisting of a foaming agent, a crosslinking agent, a foaming promoter, a crosslinking promoter, a dispersion promoter and a filler.

In the above thermoplastic elastomer foaming material, the foaming agent in a range from 1.0 to 10 parts by weight includes at least one selected from a group consisting of an azodicarbonamide, a 2-hydroxypropane-1,2,3-tricarboxylic acid and a microsphere having a polymer shell encapsulated with a gas, the crosslinking agent in a range from 0.2 to 5 parts by weight includes at least one selected from a group consisting of a dicumyl peroxide, a bis(t-butylperoxy isopropyl) benzene and an n-butyl 4,4-di(t-butyl peroxy) valerate, the foaming promoter includes a zinc oxide in a range from 0.5 to 6 parts by weight, the crosslinking promoter in a range from 0.1 to 1.5 parts by weight includes at least one of a trimethylolpropane trimethacrylate and a triallyl isocyanurate, the dispersion promoter in a range from 0.2 to 5 parts by weight includes at least one of an aliphatic stearic acid and zinc stearate, and the filler includes a calcium carbonate in a range from 1 to 120 parts by weight.

The above thermoplastic elastomer foaming material further comprises an anti-shrinkage agent being a polystyrene.

In the above thermoplastic elastomer foaming material, the polystyrene has a weight average molecular weight in a range from 50,000 to 500,000 grams per mole.

The above thermoplastic elastomer foaming material further comprises a fragrant compound.

In the above thermoplastic elastomer foaming material, the fragrant compound includes one of a flower smell compound and a fruit smell compound.

In the above thermoplastic elastomer foaming material, the fruit smell compound includes an orange oil.

In the above thermoplastic elastomer foaming material, the fragrant compound is a natural compound.

In one aspect of the present invention, it relates to a method of manufacturing a footwear by using the above thermoplastic elastomer foaming material.

In the other aspect of the present invention, it relates to a footwear comprising the above thermoplastic elastomer foaming material.

DETAILED DESCRIPTION OF THE INVENTION

The present invention will now be described more specifically with reference to the following embodiments. It is to be noted that the following descriptions of preferred embodiments of this invention are presented herein for the aspect of illustration and description only; it is not intended to be exhaustive or to be limited to the precise form disclosed.

The present invention provides a hydrogenated styrenic/conjugated diene series copolymer matrix foaming material since the copolymer is easy to be processed and has high compatibility with not only other raw materials such as polyolefinic materials and plasticizers but most conventional additives, such as foaming agents, crosslinking agents, foaming promoters, crosslinking promoters, dispersion promoters and fillers.

The conjugated diene used in the present invention is one selected from the group consisting of 1,3-butadiene, isoprene, 1,3-pentadiene and a combination thereof, wherein the available unsaturated double bonds of a polymeric unit of the conjugated diene are under 10%, preferably under 5%. The conjugated diene used in the present invention is also obtained from commercial products on the market. As to hydrogenated styrenic/conjugated diene block copolymer, where 1,3 butadiene is used as conjugated diene, Kraton G Series of Kraton, Septon 6 and Septon 8 Series of Septon, SEBS series of TSRC, SEBS 2 Series of Polymeri, Calprene H Series of Dynasol and Tuftec H of Asahi are suitable.

As to hydrogenated styrenic/conjugated diene block or random copolymer, where 1,3-butadiene is used as conjugated diene, Dynaron Series and Dynaflex Series of JSR are suitable. As to hydrogenated styrenic/conjugated diene block copolymer, where isoprene is used as conjugated diene, styrene-ethylene-propylene-styrene thermoplastic elastomer of Septon 2 Series of Kuraray and Septon is suitable. And as to hydrogenated styrenic/conjugated diene block copolymer, where isoprene and 1,3-butadiene are used as conjugated diene, styrene-[ethylene(ethylene-propylene)]-styrene thermoplastic elastomer of Septon 4 Series of Kuraray and Septon is suitable.

Synthetic and commercial hydrogenated styrenic/conjugated diene copolymers used in the present invention have a molecular weight of from about 80,000 to about 500,000 grams per mole (measured by PS standardized GPC) without containing any processing oil.

The process of mixing a raw rubber/plastic material with different kinds of raw rubbers or with fillers, plasticizers, promoting agents, cross-linking agents, foaming agents to become a formulated rubber, which has desired physical properties and good dispersion with additives and makes the raw rubber plasticized, is called compounding. Compounding apparatus are usually divided into two types, continuous and batch. To make different kinds of products with small amounts of each one, rubbers are usually processed in batch mixers.

The main advantage of batch mixers is big operating window. Processing recipes such as compounding time, mixing order of raw materials and temperatures are easy to be set depending on different requirements so batch mixers are widely used in this industry. The foamed articles of the present invention are made by this kind of mixer. And compounded articles are usually pressed into a flat structure by a mill for performing a mold foaming.

In one embodiment of the present invention, hydrogenated styrenic/conjugated diene copolymers and plasticizers are mixed at a temperature between about 50° C. and about 70° C. and adsorbed over 24 hours until adsorption between the copolymers and the plasticizers is completed. After that, polyolefinic materials, rubbers and other additives are incorporated into the mixture of the copolymers and the plasticizers and then cooled. Pellets of the compounded material are made by a kneader, a banbury mixer or a twin-screw extruder. Various ratios of cross-linking agents and foaming agents may be added into the pellets to perform a foam molding in a press apparatus under an appropriate temperature and pressure.

The plasticizer used in the present invention can be a processing oil such as paraffinic oil, naphthenic oil and aromatic oil. Adding processing oils can lower the material cost and improve processing properties. However, the aromatic concentration ($C_A$%) of processing oils can not be too high, or the cross-linking efficiency will be reduced. The preferable $C_A$% is in the range of 0 to 20% so preferred processing oil of the present invention is paraffinic oil.

The polyolefinic materials which are useful in the present invention are homopolymers or copolymers of olefins such as ethylene vinyl acetate (EVA), ethylene-butylacrylate (EBA), ethylene-α-olefin copolymer (EOC) and a combination thereof.

Rubbers can be used in the present invention optionally. The rubbers include ethylene-propylene-nonconjugated diene rubber (EPDM), isoprene rubber (IR), styrene-butadiene rubber (SBR), acrylonitrile-butadiene rubber (NBR), butadiene rubber (BR) and a combination thereof.

A foam article can be made by adding foaming agents or using supercritical fluid technology. The foaming agents used in the present invention include physical or chemical foaming agents and a combination thereof. The physical foaming agents comprise fluorinated hydrocarbons, nitrogen, other gases excluding nitrogen, and aliphatic hydrocarbons such as propane, isobutane, pentane and hexane. And the chemical foaming agents comprise azodicarbonamide, nitroso, hydrazide, hydrazo, sodium bicarbonate and ammonium carbonate.

Preferably, the foaming material in accordance with the present invention comprises from about 1 to about 10 parts by weight azodicarbonamide (AC) as a foaming agent.

In one preferred embodiment of the present invention, physical properties of the foaming material are altered by adding cross-linking agents, cross-linking promoters, foaming promoters, dispersion promoters and fillers during processing.

In one preferred embodiment of the present invention, organic peroxides, such as dicumyl peroxide (DCP), are used from about 0.2 to about 5 parts by weight as a cross-linking agent. The ratio of AC to DCP is from about 0.2 to about 5/about 1 to about 10.

In one preferred embodiment of the present invention, metal oxides, such as zinc oxide (ZnO), are used from about 0.5 to about 6 parts by weight as a foaming promoter.

Further, aliphatic stearic acid ($C_{17}H_{35}COOH$) which is a white solid with a melting point between 59° C. and 62° C. is used as a dispersion promoter. The foaming material contains about 0.2 to about 5 parts by weight aliphatic stearic acid.

PL-400 available from Taisun Trade Co. Ltd., Taiwan is a high molecular weight methacrylate ($C_{18}H_{25}O_5$) which is used as a cross-linking promoter in a preferred embodiment of the present invention. The foaming material contains about 0.1 to about 1.5 parts by weight PL-400.

Light calcium carbonate optionally acts as a filler in one preferred embodiment of the present invention from about 1 to about 120 parts by weight.

To further illustrate the present invention, several preferred embodiments and comparative examples are described as below. The compositions of preferred embodiments are shown in Table 1 and Table 2.

Comparative Example 1

In a kneader compounding apparatus, 30 parts by weight Engage-8480 available from DuPont and 70 parts by weight EVA containing 18% VA are compounded initially at 80° C. Additives, such as 2.3 parts by weight AC foaming agent, 0.85 parts by weight DCP crosslinking agent, 1.5 parts by weight activated zinc oxide foaming promoter, 0.4 parts by weight PL-400 crosslinking promoter and 0.5 parts by weight stearic acid dispersion promoter, are added into the compounded material when the temperature rises to 100° C. The compounding process is continued until the temperature rises to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm² for 18 minutes.

In the above foaming article, the hardness and the specific gravity are 57 C and 0.26, respectively.

Comparative Example 2

3 percents by weight SEBS copolymer of SEBS-3151 available from Taipol is mixed with 4 percents by weight paraffinic oil of PW-32 available from Idemitsu at 50° C. until adsorbs completely in a mixer, and then compound with 90 percents by weight EVA containing VA 18% in a kneader compounding apparatus at 80° C. Additives, 1 part by weight AC foaming agent, 0.7 part by weight DCP crosslinking agent, 0.7 part by weight activated zinc oxide foaming promoter, 0.3 part by weight PL-400 crosslinking promoter and 0.3 part by weight stearic acid dispersion promoter, are added into the compounded material when the temperature rises to 100° C. The compounding process is continued until the temperature rose to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm$^2$ for 18 minutes.

In the above foaming article, the hardness and the specific gravity are 60 C and 0.33, respectively.

Preferred Embodiment 1

50 parts by weight SEBS thermoplastic elastomer of SEBS-3151 available from Taipol are mixed with 20 parts by weight paraffinic oil of PW-32 at 50° C. until adsorbs completely in a mixer. After complete adsorption, 30 parts by weight EPDM, 30 parts by weight EVA, 0.5 parts by weight stearic acid dispersion promoter and 50 parts by weight light calcium carbonate filler are added, and then all of the above substances are compounded in a kneader compounding apparatus at 80° C. Additives, 6 parts by weight AC foaming agent, 1.2 parts by weight DCP crosslinking agent, 1 part by weight activated zinc oxide foaming promoter and 0.5 part by weight PL-400 crosslinking promoter, are added into the compounded material when the temperature rises to 100° C. The compounding process is continued until the temperature rose to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm$^2$ for 18 minutes.

Preferred Embodiment 2-5

As shown in Table 1, in Preferred Embodiments 2, 3 and 4, the rubbers are 30 parts by weight SBR, 30 parts by weight IR and 30 parts by weight NBR, respectively, and the processing oils are 40, 60, 100 parts by weight, respectively. Other processing conditions and compositions are the same with Preferred Embodiment 1 except the rubbers and processing oils.

TABLE 1

|  | Preferred Embodiment | | | |
|---|---|---|---|---|
|  | 1 | 2 | 3 | 4 |
| Taipol-3151 (SEBS) | 50 | 50 | 50 | 50 |
| paraffinic oil (processing oil) | 20 | 40 | 60 | 100 |
| EPDM (rubber) | — | — | 30 | — |
| SBR (rubber) | 30 | — | — | — |
| IR (rubber) | — | 30 | — | — |
| NBR (rubber) | — | — | — | 30 |
| EVA (polyolefinic material) | 20 | 20 | 20 | 20 |
| CaCO$_3$ (Filler) | 50 | 50 | 50 | 50 |
| ZnO (foaming promoter) | 1 | 1 | 1 | 1 |
| SA (dispersion promoter) | 0.5 | 0.5 | 0.5 | 0.5 |
| PL-400 (crosslinking promoter) | 0.5 | 0.5 | 0.5 | 0.5 |
| DCP (crosslinking agent) | 1.2 | 1.2 | 1.2 | 1.2 |
| AC (foaming agent) | 6 | 6 | 6 | 6 |
| Hardness | 30 C | 21 C | 13 C | 6 C |
| Specific Gravity | 0.20 | 0.16 | 0.14 | 0.12 |

In Preferred Embodiment 1, the hardness and specific gravity of the SEBS block copolymer foaming material are 30 C and 0.2, respectively. From Preferred Embodiments 1 to 4, it is known that the hardness and the specific gravity of the foaming material can be modified by adding different ratios of processing oils. And foaming articles obtained in Preferred Embodiments 1 to 4 are soft in touch with micro foaming structures.

From the above Preferred Embodiments, the hardness and the specific gravity of the SEBS block copolymer foaming materials obtained from the present invention are between 5 C and 30 C and 0.1 and 0.25, respectively.

Preferred Embodiment 5

51 percents by weight styrene-[ethylene-(ethylene-propylene)]-styrene(SEEPS) Septon-4055 available from Kuraray is mixed with 17.2 percents by weight paraffinic oil of PW-32 available from Idemitsu at 50° C. until adsorbed completely in a mixer. After complete adsorption, 17.2 percents by weight EVA containing 18% VA and 10 parts by weight light calcium carbonate filler are added, and then all of the above substances are compounded in a kneader compounding apparatus at 80° C. Additives, 3 parts by weight AC foaming agent, 1 part by weight DCP crosslinking agent, 1.2 parts by weight activated zinc oxide foaming promoter, 0.5 part by weight PL-400 crosslinking promoter and 0.5 part by weight stearic acid dispersion promoter, are added into the compounded material when the temperature rises to 100° C. The compounding process is continued until the temperature rises to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm$^2$ for 18 minutes.

In the above foaming article, the hardness and the specific gravity are 25 C and 0.21, respectively.

Preferred Embodiment 6

17.2 percents by weight styrene-ethylene-butylene-styrene (SEBS) copolymer of SEBS-3151 available from Taipol is mixed with 21.5 percents by weight paraffinic oil of PW-32 available from Idemitsu at 50° C. until adsorbed completely in a mixer. After complete adsorption, 47.3 percents by weight EVA and 10 parts by weight light calcium carbonate filler are added, and then all of the above substances are compounded in a kneader compounding apparatus at 80° C. Additives, 3 parts by weight AC foaming agent, 1 part by weight DCP crosslinking agent, 1.2 parts by weight activated zinc oxide foaming promoter, 0.5 part by weight PL-400 crosslinking promoter and 0.5 part by weight stearic acid dispersion promoter, are added into the compounded material when the temperature rises to 100° C. The compounding process is continued until the temperature rose to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm² for 18 minutes.

In the above foaming article, the hardness and the specific gravity are 20 C and 0.13, respectively.

Preferred Embodiment 7

15.9 percents by weight styrene-[ethylene-(ethylene-propylene)]-styrene(SEEPS) Septon-4055 available from Kuraray is mixed with 19.8 percents by weight paraffinic oil of PW-32 at 50° C. until adsorbed completely in a mixer. After complete adsorption, 43.7 percents by weight low density polyethylene(LDPE), 0.5 part by weight light stearic acid dispersion promoter, 1 part by weight antioxidant and 20 parts by weight light calcium carbonate filler are added, and then all of the above substances are compounded in a kneader compounding apparatus at 80° C. Additives, 2.5 parts by weight AC foaming agent, 1 part by weight DCP crosslinking agent, 1 part by weight activated zinc oxide foaming promoter, 0.5 part by weight PL-400 crosslinking promoter and 0.5 part by weight stearic acid dispersion promoter, are added into the compounded material when the temperature rises to 100° C. The compounding process is continued until the temperature rises to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm² for 18 minutes.

In the above foaming article, the hardness and the specific gravity are 28 C and 0.11, respectively.

Preferred Embodiment 8

19.9 percents by weight styrene-ethylene-butylene-styrene (SEBS) copolymer of SEBS-3151 available from Taipol is mixed with 15.9 percents by weight naphthenic oil of 222u available from Nynas at 50° C. until adsorbs completely in a mixer. After complete adsorption, 43.8 percents by weight EVA and 20 parts by weight light calcium carbonate filler are added, and then compounded all above substances in a kneader compounding apparatus at 80° C. Additives, 2.5 parts by weight AC foaming agent, 1 part by weight DCP crosslinking agent, 1 part by weight activated zinc oxide foaming promoter, 0.5 part by weight PL-400 crosslinking promoter and 0.5 part by weight stearic acid dispersion promoter, are added into the compounded material when the temperature rises to 100° C. The compounding process is continued until the temperature rises to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm² for 18 minutes.

In the above foaming article, the hardness and the specific gravity are 24 C and 0.13, respectively.

Preferred Embodiment 9

21.6 percents by weight styrene-ethylene-butylene-styrene (SEBS) copolymer of SEBS-3151 available from Taipol is mixed with 43.2 percents by weight paraffinic oil of PW-32 at 50° C. until adsorbs completely in a mixer. After complete adsorption, 21.6 percents by weight EVA and 10 parts by weight light calcium carbonate filler are added, and then all of the above substances are compounded in a kneader compounding apparatus at 80° C. Additives, 2.5 parts by weight AC foaming agent, 1 part by weight DCP crosslinking agent, 1 part by weight activated zinc oxide foaming promoter, 0.5 part by weight PL-400 crosslinking promoter and 0.5 part by weight stearic acid dispersion promoter, are added into the compounded material when the temperature rises to 100° C. The compounding process is continued until the temperature rises to 110° C., and then the compounded material is removed from the kneader compounding apparatus into a mill compounding apparatus at 80° C. The compounded material is shaped into a thin structure by means of the mill compounding apparatus. It weights 260 grams measuring by an electron balance. Finally, the compounded material is put in a foaming apparatus with a die having a dimension of 140 mm×100 mm×12 mm at 160° C. The foaming article of the compounded material is obtained by hot pressing it under 150 kg/cm² for 18 minutes.

In the above foaming article, the hardness and the specific gravity are 4 C and 0.11, respectively.

TABLE 2

| | Preferred Embodiment | | | | |
| --- | --- | --- | --- | --- | --- |
| | 5 | 6 | 7 | 8 | 9 |
| Taipol-3151 (SEBS) | — | 17.2% | — | 19.9% | 21.6% |
| Septon-4055 (SEEPS) | 51% | — | 15.9% | — | — |
| paraffinic oil (processing oil) | 17.2% | 21.5% | 19.8% | — | 43.2% |
| naphthenic oil (processing oil) | — | — | — | 15.9% | — |
| EVA (polyolefinic material) | 17.2% | 47.3% | — | 43.8% | 21.6% |
| LDPE (polyolefinic material) | — | — | 43.7% | — | — |
| CaCO₃ (Filler) | 10 | 10 | 20 | 20 | 10 |
| ZnO (foaming promoter) | 1.2 | 1.2 | 1 | 1 | 1 |
| SA (dispersion promoter) | 0.5 | 0.5 | 1 | 0.5 | 0.5 |
| PL-400 (crosslinking promoter) | 0.5 | 0.5 | 0.5 | 0.5 | 0.5 |
| DCP (crosslinking agent) | 1 | 1 | 1 | 1 | 1 |
| AC (foaming agent) | 3 | 3 | 2.5 | 2.5 | 2.5 |
| Hardness | 25 C | 20 C | 28 C | 24 C | 4 C |

Preferred Embodiment 10

The SEBS thermoplastic elastomer of SEBS-3151 available from Taipol in 140 parts by weight is mixed with paraffinic oil of PW-32 as a plasticizer in 168 parts by weight at 50°

C., until the adsorptions is completed in a mixer. After the complete adsorption, the amorphous polyolefin in 384 parts by weight, the ethylene vinyl acetate (EVA) in 91 parts by weight, the polystyrene with the weight average molecular weight about 250,000 gram/mole in 50 parts by weight, the stearic acid (SA) as a dispersion promoter in 2 parts by weight and the calcium carbonate as a filler in 149 parts by weight light are added. Then all of the above substances are compounded in a kneader compounding apparatus at 80° C. The additives, including the azodicarbonamide (AC) as a foaming agent in 22 parts by weight, the bis(t-butylperoxy isopropyl) benzene (BIPB) as a crosslinking agent in 11 parts by weight, the activated zinc oxide (ZnO) as a foaming promoter in 10 part by weight, the pigment in 15 parts by weight and zinc stearate (ZnSA) in 5 parts by weight, are added into the compounded material, when the temperature rises to 100° C. In this embodiment, the antioxidant (AO) is not added. In other embodiments, the AO can be optionally added to enhance the anti-oxidation effect at this step of introducing additives. The compounding process is continued until the temperature rose to 110° C., and then the compounded material is transferred from the kneader compounding apparatus into a mill compounding apparatus at 80° C. The compounded material is shaped into a thin structure by means of the mill compounding apparatus. It weights 260 grams measured by an electron balance. Finally, the compounded material is put in a foaming apparatus with a die having a dimension of 140 mm×100 mm×12 mm at 160° C. The foaming article of the compounded material is obtained by hot pressing under 150 kg/cm$^2$ for 18 minutes.

Preferred Embodiments 11-15

The processes of the preferred embodiments 11-15 are the same as that of the preferred embodiment 10, but the ingredients of the preferred embodiments 11-15 are varied according to Table 3 to tune their properties.

TABLE 3

(unit: relative parts)

| | Embodiments | | | | | |
|---|---|---|---|---|---|---|
| | 10 | 11 | 12 | 13 | 14 | 15 |
| SEBS | 140 | 143 | 140 | 151 | 151 | 151 |
| Oil | 168 | 237 | 259 | 181 | 181 | 181 |
| Acetate (Acrylate) Copolymer | 91 | 83 | 78 | 95 | 95 | 95 |
| Polyolefin | 384 | 345 | 347 | 341 | 341 | 341 |
| CaCO$_3$ | 149 | 140 | 132 | 160 | 160 | 160 |
| Pigment | 15 | 15 | 15 | 15 | 15 | 15 |
| Polystyrene | 50 | 35 | 27 | 54 | 54 | 54 |
| BIPB | 11 | 11 | 11 | 11 | 14 | 14 |
| Azodicarbonamide | 22 | 23 | 23 | 22.5 | 24 | 24 |
| ZnO | 10 | 10 | 10 | 10 | 10 | 10 |
| Zinc Stearate | 5 | 5 | 5 | 5 | 5 | 5 |
| Stearic Acid | 2 | 1 | 2 | 2 | 2 | 2 |
| AO | 0 | 1 | 1 | 0 | 0 | 0 |
| Total | 1047 | 1049 | 1050 | 1047.5 | 1052 | 1052 |

The physical and mechanical properties of the preferred embodiments 10-15 are measured and shown in Table 4.

TABLE 4

| | Embodiments | | | | | |
|---|---|---|---|---|---|---|
| | 10 | 11 | 12 | 13 | 14 | 15 |
| Type C (Asker) | 35 C | 25 C | 20 C | 25 C | 18 C | 20 C |
| Shore (OO) | 75 | 63 | 58 | 63 | 52 | 57 |
| Foam Ratio | 1.52 | 1.58 | 1.62 | 1.60 | 1.64 | 1.62 |
| Sp. Gr. (g/cm$^3$) | 0.196 | 0.177 | 0.174 | 0.178 | 0.163 | 0.176 |
| Energy Return (ASTM-D2632) | 60 | 60 | 60 | 60 | 65 | 65 |
| Compression Set (25° C. @6 hr) | 8% | 10% | 10% | 10% | 10% | 14% |

From Table 4, the physical and mechanical properties of elastomer foaming material in preferred embodiments 10-15 can be tailored by varying the relative contents of the ingredients so as to meet the practical requirements. For example, the paraffinic oil and foaming agent have great influence on the properties of hardness and energy return, which is important for some applications, e.g. footwear, tires, sealing rings, etc.

In the embodiments 10-15, the conjugated diene in SEBS, i.e. the hydrogenated styrenic/conjugated diene copolymer, can be chosen from 1,3-butadiene, isoprene, 1,3-pentadiene or the combination thereof. The weight average molecular weight of SEBS can be in a range from about 80,000 to about 500,000 grams per mole.

The EVA in the embodiments 10-15 can be substituted with other acetate copolymers or acrylate copolymers, e.g. ethylene-vinyl acetate-maleic anhydride terpolymer, ethylene-methyl acrylate copolymer, ethylene-butyl acrylate copolymer, ethylene-ethyl hexyl acrylate copolymer, ethylene-acrylic ester-maleic anhydride terpolymer, ethylene-acrylic ester-glycidyl methacrylate terpolymer or the combination thereof.

The amorphous polyolefin in the embodiments 10-15 can be chosen from polypropylene, propylene-ethylene copolymer, ethylene-α-olefin copolymer, propylene-α-olefin copolymer, ethylene-propylene-α-olefin terpolymer or the combination thereof.

The paraffinic oil in the embodiments 10-15 can be substituted with naphthenic oil, aromatic oil, natural oil or a combination of at least two of paraffinic oil, naphthenic oil, aromatic oil and natural oil.

The polystyrene in the embodiments 10-15 works as an anti-shrinkage agent, and can have weight average molecular weight in a range of 50,000 to 500,000 gram/mole.

The azodicarbonamide (AC) can be substituted with other foaming agents, e.g. 2-hydroxypropane-1,2,3-tricarboxylic acid or microspheres having polymer shells encapsulated with gas.

The bis(t-butylperoxy isopropyl)benzene (BIPB) in the embodiments 10-15 can be substituted with other crosslinking agent, e.g. dicumyl peroxide (DCP) or n-butyl 4,4-di(t-butyl peroxy)valerate, etc.

In the embodiments 10-15, the crosslinking promoters, e.g. trimethylolpropane trimethacrylate, triallyl isocyanurate, etc., can be optionally added to tune the crosslinking efficiency, depending on the practical requirements.

One or more fragrant compounds can be optionally added into the elastomer foaming materials in the embodiments 10-15 to provide the desired smell. The fragrant compounds may include flower smell compounds or fruit smell compounds, e.g. orange oil. These fragrant compounds can be extracted from the natural plants or be synthesized.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims that are to be accorded with the broadest interpretation, so as to encompass all such modifications and similar structures.

What is claimed is:

1. A thermoplastic elastomer foaming material, comprising:
   a hydrogenated styrenic/conjugated diene copolymer in a range from 16 to 50 weight percent based on the total weight of the thermoplastic elastomer foaming material;
   a polyolefin being in a range from 7 to 50 weight percent based on the total weight of the thermoplastic elastomer foaming material and having at least one of ethylene vinyl acetate and ethylene butyl acrylate in a range from 3 to 30 weight percent based on the total weight of the thermoplastic elastomer foaming material; and
   a plasticizer in a range from 16 to 45 weight percent based on the total weight of the thermoplastic elastomer foaming material.

2. A thermoplastic elastomer foaming material as claimed in claim 1, wherein the hydrogenated styrenic/conjugated diene copolymer has a weight average molecular weight of from about 80,000 to about 500,000 grams per mole.

3. A thermoplastic elastomer foaming material as claimed in claim 1, wherein the conjugated diene includes one selected from a group consisting of a 1,3-butadiene, an isoprene, a 1,3-pentadiene and a combination thereof, and a polymeric unit of the conjugated diene has unsaturated double bonds less than 10%.

4. A thermoplastic elastomer foaming material as claimed in claim 1, wherein the polyolefin further includes at least one selected from a group consisting of a polypropylene, a propylene-ethylene copolymer, an ethylene-α-olefin copolymer, a propylene-α-olefin copolymer and an ethylene-propylene-α-olefin terpolymer.

5. A thermoplastic elastomer foaming material as claimed in claim 1, wherein the plasticizer includes a processing oil.

6. A thermoplastic elastomer foaming material as claimed in claim 5, wherein the processing oil is one selected from a group consisting of a paraffinic oil, a naphthenic oil, an aromatic oil, a natural oil and a combination thereof.

7. A thermoplastic elastomer foaming material as claimed in claim 5, wherein the processing oil contains aromatics in a range from 0.01 to 20 weight percent.

8. A thermoplastic elastomer foaming material as claimed in claim 5, wherein the processing oil is free of aromatics.

9. A thermoplastic elastomer foaming material as claimed in claim 1, further comprising at least one additive selected from a group consisting of a foaming agent, a crosslinking agent, a foaming promoter, a crosslinking promoter, a dispersion promoter and a filler.

10. A thermoplastic elastomer foaming material as claimed in claim 9, wherein:
   when the thermoplastic elastomer comprises the foaming agent, the foaming agent ranges from 1.0 to 10 parts by weight and includes at least one selected from a group consisting of an azodicarbonamide, a 2-hydroxypropane-1,2,3-tricarboxylic acid and a microsphere having a polymer shell encapsulated with a gas,
   when the thermoplastic elastomer comprises the crosslinking agent, the crosslinking agent ranges from 0.2 to 5 parts by weight and includes at least one selected from a group consisting of a dicumyl peroxide, a bis(t-butylperoxy isopropyl) benzene and an n-butyl 4,4-di(t-butyl peroxy) valerate,
   when the thermoplastic elastomer comprises the foaming promoter, the foaming promoter includes a zinc oxide and ranges from 0.5 to 6 parts by weight,
   when the thermoplastic elastomer comprises the crosslinking promoter, the crosslinking promoter in a range ranges from 0.1 to 1.5 parts by weight and includes at least one of a trimethylolpropane trimethacrylate and a triallyl isocyanurate,
   when the thermoplastic elastomer comprises the dispersion promoter, the dispersion promoter ranges from 0.2 to 5 parts by weight and includes at least one of an aliphatic stearic acid and a zinc stearate, and
   when the thermoplastic elastomer comprises the filler, the filler includes a calcium carbonate and ranges from 1 to 120 parts by weight.

11. A thermoplastic elastomer foaming material as claimed in claim 1, further comprising an anti-shrinkage agent being a polystyrene.

12. A thermoplastic elastomer foaming material as claimed in claim 11, wherein the polystyrene has a weight average molecular weight in a range from 50,000 to 500,000 grams per mole.

13. A thermoplastic elastomer foaming material as claimed in claim 1, further comprising a fragrant compound.

14. A thermoplastic elastomer foaming material as claimed in claim 13, wherein the fragrant compound includes one of a flower smell compound and a fruit smell compound.

15. A thermoplastic elastomer foaming material as claimed in claim 14, wherein the fruit smell compound includes an orange oil.

16. A thermoplastic elastomer foaming material as claimed in claim 13, wherein the fragrant compound is a natural compound.

17. A thermoplastic elastomer foaming material as claimed in claim 1, wherein the at least one of ethylene vinyl acetate and ethylene butyl acrylate is in a range from 7 to 9 weight percent based on the total weight of the thermoplastic elastomer foaming material.

18. A method of manufacturing a footwear by using the thermoplastic elastomer foaming material as claimed in claim 1, comprising: providing a hydrogenated styrenic/conjugated diene copolymer in a range between 16 and 50 weight percent based on the total weight of the thermoplastic elastomer foaming material;
   mixing the copolymer with a polyolefin and a plasticizer to form the thermoplastic elastomer foaming material, wherein the polyolefin is in a range between 7 and 50 weight percent based on the total weight of the thermoplastic elastomer foaming material and has at least one of ethylene vinyl acetate and ethylene butyl acrylate in a range between 3 and 30 weight percent based on the total weight of the thermoplastic elastomer foaming material, and the plasticizer is in a range of between 16 and 45 weight percent based on the total weight of the thermoplastic elastomer foaming material; and
   foaming the thermoplastic elastomer foaming material to form the footwear material.

19. A footwear, comprising the thermoplastic elastomer foaming material as claimed in claim 1.

20. A footwear as claimed in claim 19, wherein the thermoplastic elastomer foaming material further comprises at least one additive selected from a group consisting of a foaming agent, a crosslinking agent, a foaming promoter, a crosslinking promoter, a dispersion promoter and a filler.

* * * * *